United States Patent
Conrardy et al.

(10) Patent No.: US 8,499,983 B2
(45) Date of Patent: Aug. 6, 2013

(54) TANK HAVING A PISTON PRESSURIZED BY HOT GAS

(75) Inventors: Jean-Marie Conrardy, Courcelles sur Seine (FR); Daniel Peyrisse, Saint Marcel (FR); Dominique Le Louedec, Saint Marcel (FR)

(73) Assignee: Snecma, Paris (FR)

( * ) Notice: Subject to any disclaimer, the term of this patent is extended or adjusted under 35 U.S.C. 154(b) by 281 days.

(21) Appl. No.: 12/388,220

(22) Filed: Feb. 18, 2009

(65) Prior Publication Data

US 2009/0206111 A1 Aug. 20, 2009

(30) Foreign Application Priority Data

Feb. 19, 2008 (FR) ...................................... 08 51038

(51) Int. Cl.
*G01F 11/00* (2006.01)
(52) U.S. Cl.
USPC ..... 222/386.5; 222/389; 222/394; 222/464.1; 239/322; 239/323; 239/329
(58) Field of Classification Search
USPC ............. 222/389, 394, 464.1, 95, 386, 386.5; 239/320–323, 329, 330, 373
See application file for complete search history.

(56) References Cited

U.S. PATENT DOCUMENTS

| | | | |
|---|---|---|---|
| 2,970,452 A | | 2/1961 | Beckman et al. |
| 3,156,100 A | * | 11/1964 | Haettinger et al. ............ 62/45.1 |
| 3,494,513 A | | 2/1970 | Bauer |
| 3,592,360 A | | 7/1971 | Aleck |
| 3,847,307 A | * | 11/1974 | Hosek ........................ 222/386.5 |
| 3,847,308 A | | 11/1974 | Tambor |
| 3,847,309 A | * | 11/1974 | Grossman ................. 222/386.5 |
| 3,847,310 A | | 11/1974 | Rabe |
| 3,895,746 A | | 7/1975 | Bauer |
| 3,940,031 A | | 2/1976 | Fishman |
| 3,940,032 A | | 2/1976 | Gershon |
| 3,944,117 A | | 3/1976 | Gould |
| 4,538,749 A | | 9/1985 | Rosman et al. |
| 5,167,631 A | * | 12/1992 | Thompson et al. ........ 222/386.5 |
| 5,407,092 A | | 4/1995 | Hardgrove et al. |

FOREIGN PATENT DOCUMENTS

| | | |
|---|---|---|
| DE | 1104267 | 4/1961 |
| DE | 2136188 | 2/1973 |

* cited by examiner

*Primary Examiner* — Jason Boeckmann
(74) *Attorney, Agent, or Firm* — Preti Flaherty Beliveau & Pachios LLP

(57) ABSTRACT

The tank comprises a variable volume chamber containing a liquid and defined by a wall; and a piston suitable for moving in the tank under thrust from powder gas at a temperature much higher than that of the liquid in order to decrease the volume of the chamber. The tank also comprises a deformable elastomer membrane pressed against a face of the piston outside the chamber, the membrane being suitable for thermally protecting the wall and for providing sealing between the piston and the wall.

12 Claims, 5 Drawing Sheets

TANK HAVING A PISTON PRESSURIZED BY HOT GAS

BACKGROUND OF THE INVENTION

The invention relates to a tank having a piston pressurized by hot gas.

The invention applies particularly but not exclusively to the context of pressurizing a liquid propellant tank of the kind used for example in tactical or strategic missiles.

Document U.S. Pat. No. 3,494,513 describes a tank of this type. The tank has a piston suitable for moving under the effect of thrust from a gas so as to reduce the volume of a chamber containing a liquid, thereby causing the liquid to be expelled from the chamber via an opening formed in the end of the tank.

The chamber containing the liquid propellant is defined by a telescopic metal bladder that is initially folded in accordion fashion to present a series of folds that unfold progressively under thrust from the gas.

That mechanism presents several drawbacks.

Firstly, the telescopic arrangement of the bladder is complex to implement and can be applied only to tanks that are of conical shape.

Furthermore, on unfolding, the bladder cannot come extremely close to the inside walls of the tank, so a non-negligible quantity of liquid is not expelled from the tank.

Above all, that metal bladder system cannot be used in a tank that is pressurized by using hot gas, since the metal bladder does not act in any way as a thermal barrier. This has two consequences: firstly the wall of the tank is heated, and secondly the gas cools so its pressure drops. In a two-stage propulsion mechanism, it then becomes necessary to repressurized the gas between the two stages.

OBJECT AND SUMMARY OF THE INVENTION

A main object of the present invention is to mitigate the above-mentioned drawbacks by proposing a tank comprising:
  a variable volume chamber containing a liquid and defined by a wall;
  a piston suitable for moving in the tank under thrust from powder gas at a temperature much higher than that of the liquid in order to decrease the volume of the chamber; and
  a deformable elastomer membrane pressed against a face of the piston outside the chamber, the membrane being suitable for thermally protecting the wall and for providing sealing between the piston and the wall.

In accordance with the invention, the membrane is made of deformable elastomer material.

The elastomer membrane may in particular be polymer-based, e.g. rubber-based.

The elastomer membrane performs three functions simultaneously:
  a sealing function between the piston and the wall;
  a thermal barrier seeking to prevent or at least greatly diminish heating of the wall and cooling of the gas; and
  optimizing the volume of liquid that is ejected.

In a particular embodiment of the invention, the elastomer membrane has a thickness of the order of 2 millimeters (mm) or 3 mm. It can thus be used in application in which the liquid is at ambient temperature and the propulsion gas is at a temperature close to 1000° C.

Naturally, the thickness of the membrane may vary, in particular as a function of the size of the tank 10, as a function of the desired pressure level, as a function of the duration of the mission, and as a function of temperature level.

If the tank is used in a two-stage propulsion mechanism, thanks to the thermal barrier means, there is no need to repressurize the gas between the two stages.

Advantageously, the invention can be applied to a tank that is cylindrical in shape.

In a particular embodiment of the invention, the piston moves along a shaft that forms a duct for delivering said liquid. The liquid penetrates into the duct via an opening formed close to the end of the duct that is at the end of the chamber.

In accordance with the invention, the liquid may be delivered either in the travel direction of the piston, or in the opposite direction, or in both directions, the latter embodiment enabling two propulsion systems to be fed that are disposed on either side of the tank.

Consequently, the delivery duct has at least one open end for delivering the liquid, with the end beside the end wall of the chamber being open to enable liquid to be delivered in the travel direction of the piston, and with the opposite end being open in order to deliver liquid in the opposite direction.

When liquid is delivered in the travel direction of the piston, an opening is made through the end wall of the tank to enable the liquid to be ejected.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

Figure 1:
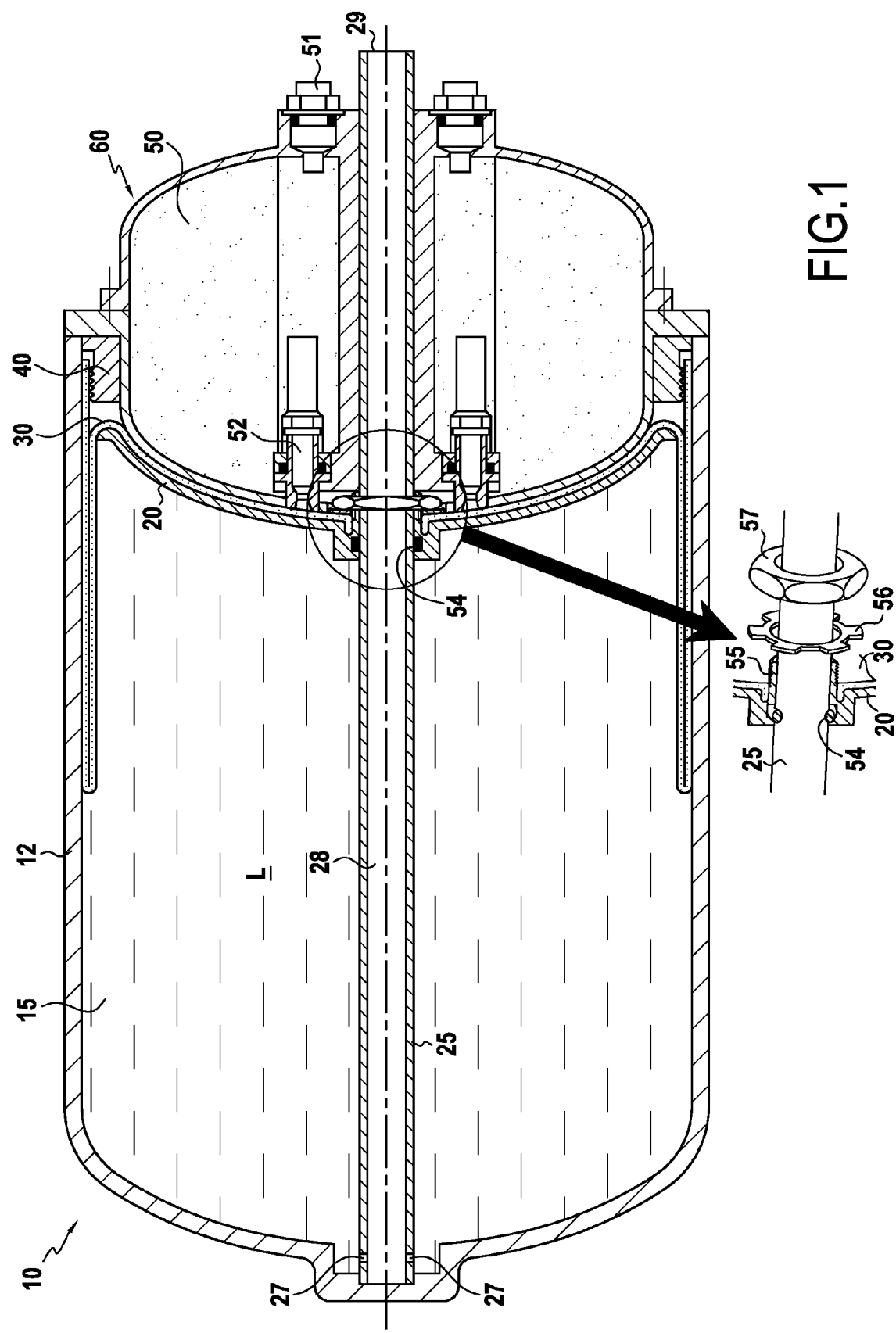
FIGS. 1 to 3 show a first embodiment of a tank of the invention in three different states.

FIG. 1 shows a first embodiment of a tank 10 in accordance with the invention.

The tank 10 is defined by a wall 12 of generally cylindrical shape.

It has a piston 20 suitable for moving along a shaft 25, the piston thus co-operating with the wall 12 to define a variable-volume chamber 15 that is filled with a liquid propellant component L at ambient temperature, i.e. at about 20° C.

In the embodiment described, the variable-volume chamber is adjacent to a gas generator 60.

In accordance with the invention, the tank 10 includes a deformable elastomer membrane 30 pressed against a face of the piston 20 that is outside the chamber 15.

This elastomer membrane 30 also provides sealing between the piston 20 and the wall 12.

In the embodiment described, the membrane 30 is held at the end of the tank 10 by annular fastener means 40 that hold the membrane against the wall 12.

Sealing between the shaft 25 and the piston 20 is provided by means of an O-ring gasket referenced 54.

In the embodiment described, the membrane 30 is held by being pinched against the outside face of the piston 20 by a washer 56 that is engaged on a hub 55, of the piston 20 that is held clamped by a nut 57.

In this embodiment, the gas generator 60 has a cylindrical recess 58 complementary to the hub 55 such that the piston 20 can be pressed against the generator when the tank 10 is full.

In the embodiment described, the washer 56 is grooved to improve radial retention of the membrane 30.

In the embodiment described, the gas generator 60 has one or more blocks of powder 50, each block of powder 50 being provided with an initiator 51 suitable for igniting it.

In known manner, ignition generates powder gas at very high temperature, about 1000° C., that is ejected by nozzles 52 towards the membrane 30 and the piston 20.

In the embodiment described, the tank can perform two successive stages of propulsion.

FIG. 1 shows the state of the tank before the first propulsion stage. In this state, the volume of the chamber 15 is at a maximum.

Consequently, the piston 20 is in a set-back position and the deformable membrane 30 matches the shape of the powder compartment 50.

Figure 2:
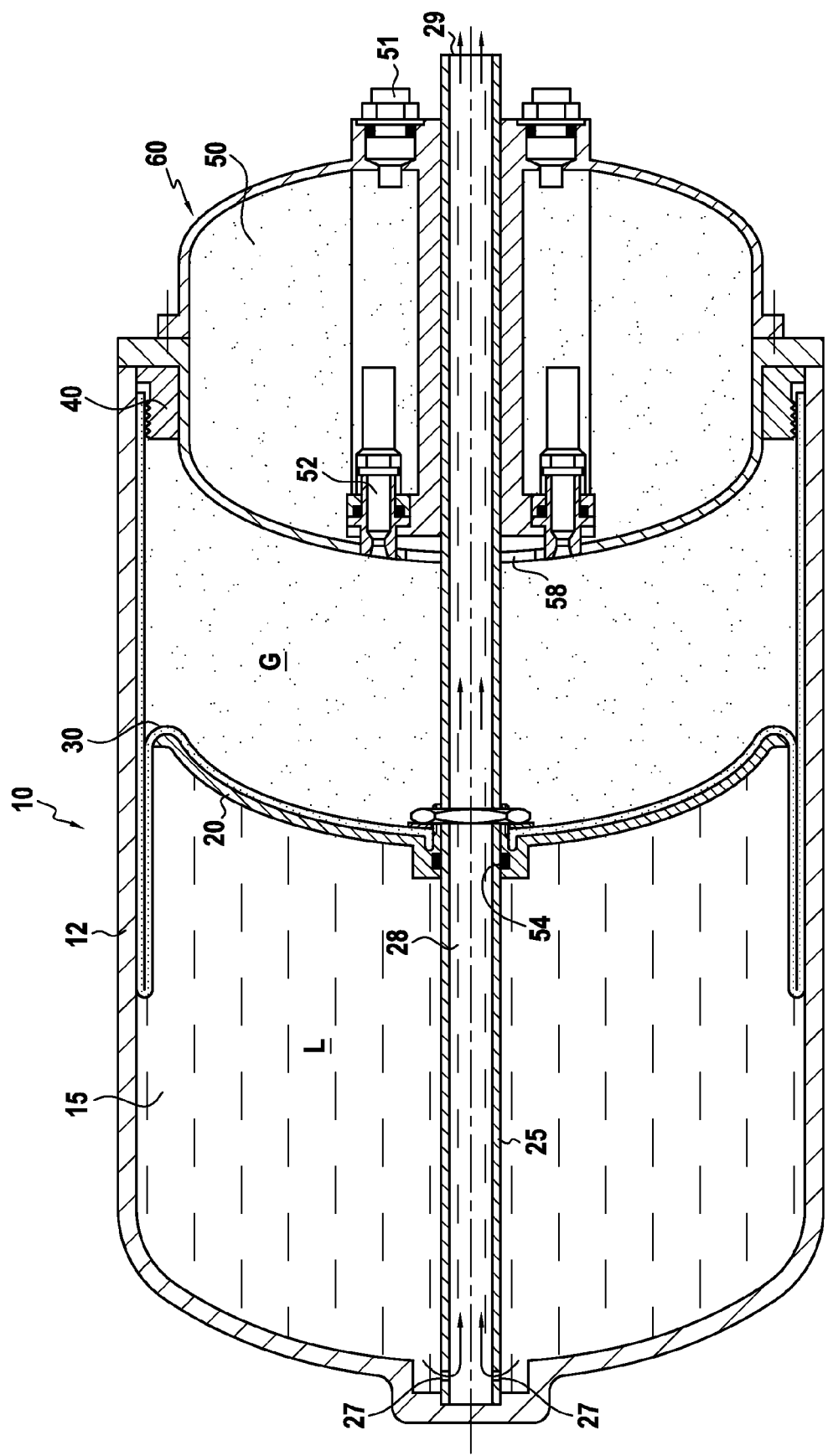

FIG. 2 shows the tank 10 after the first propulsion stage.

In this state, the volume of the chamber 15 containing the liquid has decreased, substantially by one-third in the embodiment described, the piston 20 and the elastomer membrane 30 having moved under the effect of the hot pressurized gas G. Under the effect of thrust from the piston 20, a fraction of the liquid L that was in the chamber 15 is entered through an opening 27 into the piston shaft 25 and is delivered, rearwards in FIG. 2, via a duct 28 formed inside the shaft. In this embodiment, the duct 28 has only one open end 29 and it is located remote from the opening 27.

The elastomer membrane 30 provides thermal protection for the walls 12 so the wall 12 does not become heated.

Most advantageously, the powder gas G remains hot and therefore under pressure.

Advantageously, the liquid remains well confined during this first propulsion stage, with any movement of the liquid, in known manner, being harmful during this ballistic stage.

Figure 3:
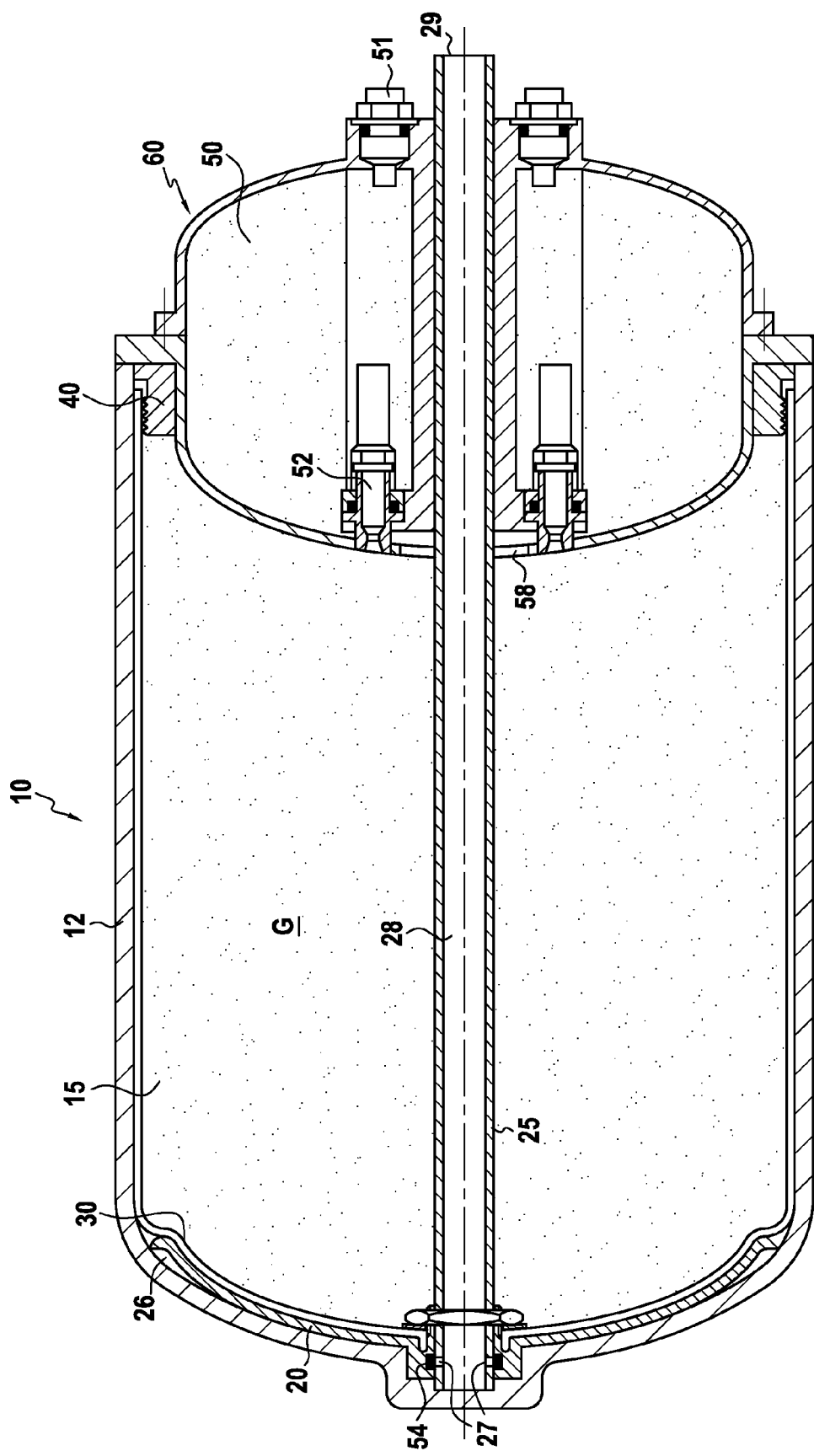

FIG. 3 shows the tank 10 after the second propulsion stage.

In this state, the piston 20 comes into abutment against the end of the tank 10. Since the elastomer membrane 30 adheres substantially to the end of the tank 10, the amount of space 26 that is "wasted", i.e. the space that contains liquid L after the second propulsion stage, is very small.

Figure 4:
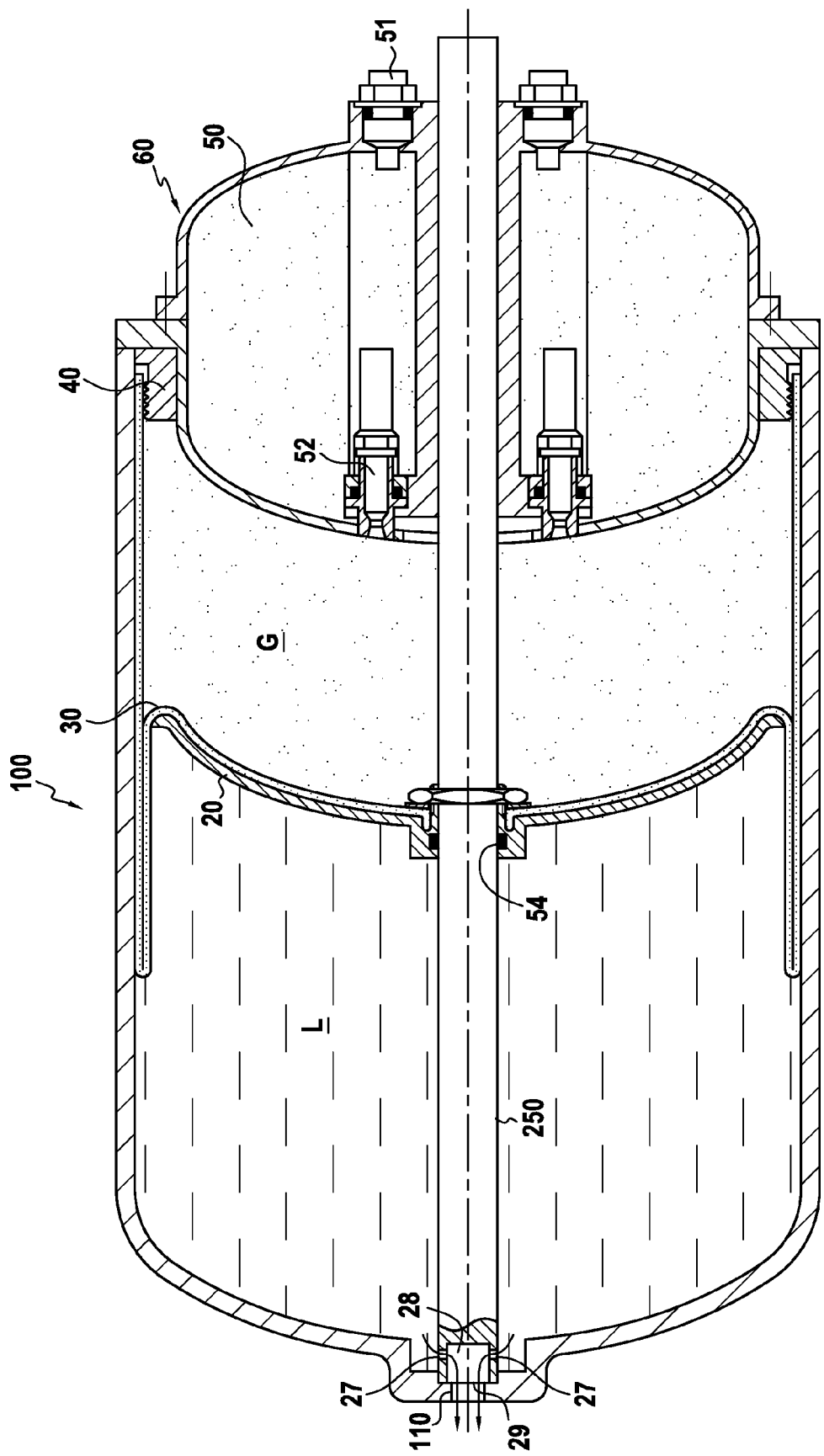
FIGS. 4 and 5 show second and third embodiments of tanks of the invention.

FIG. 4 shows a second embodiment of a tank 100 in accordance with the invention.

This tank 100 is almost identical to the tank 10 described with reference to FIGS. 1 to 3.

However in this embodiment, the liquid is delivered in the travel direction of the piston 20.

Consequently, the delivery duct 28 has only one open end 29, and that end is located close to the opening 27 for liquid ingress.

Preferably, the delivery duct 28 is closed off immediately behind the opening 27. It is no more than a cavity.

Furthermore, the tank 100 presents an opening 110 in its end wall facing the open end 27 of the duct 28.

In the embodiment described, the O-ring gasket 54 closes the inlet 27 to the duct 28 when the piston 10 reaches the end of its stroke.

Figure 5:
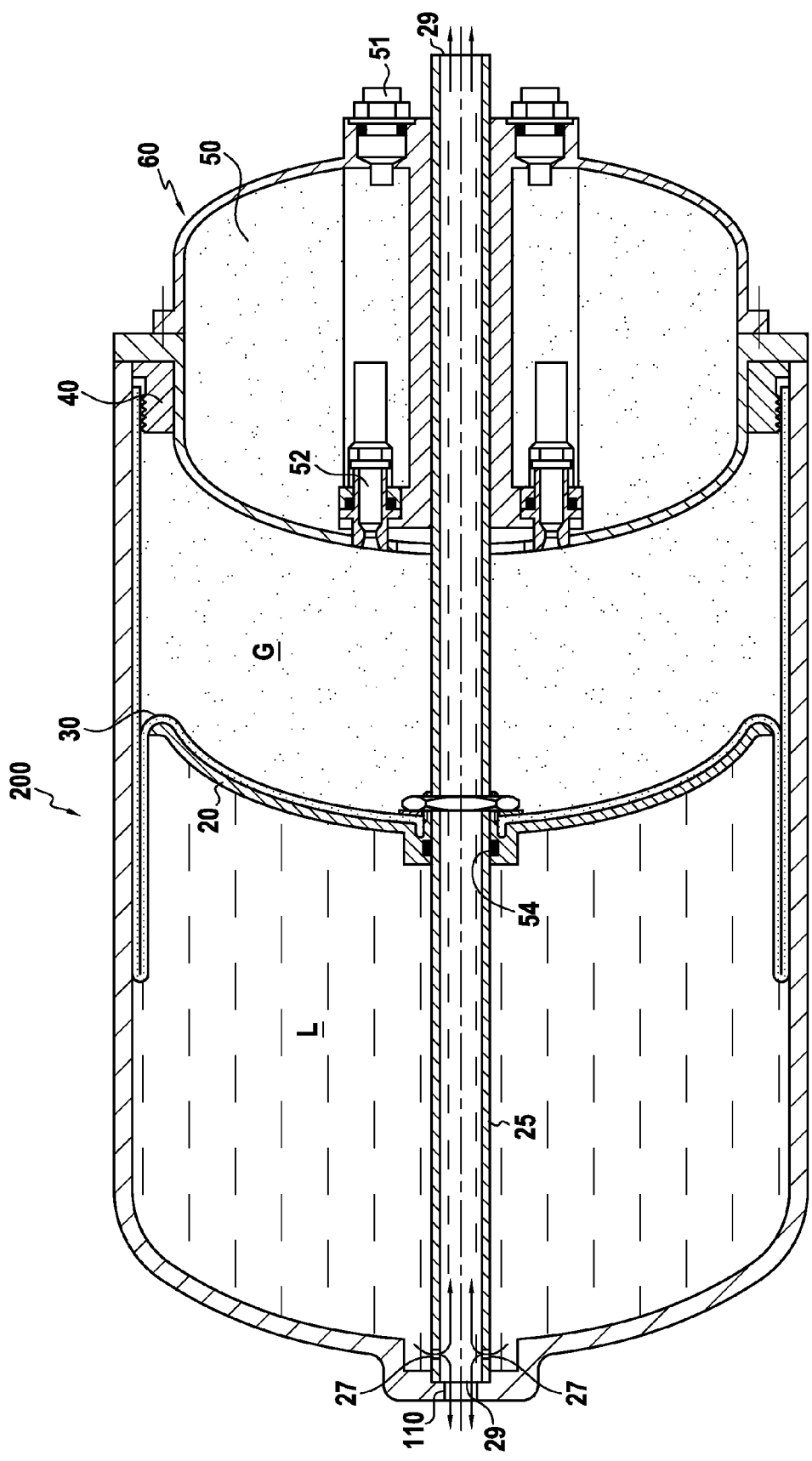

FIG. 5 shows a third embodiment of a tank 200 in accordance with the invention.

The tank 200 is practically identical to the tanks 10 and 100 described with reference to FIGS. 1 to 4.

However, in this embodiment, the liquid is delivered in both directions, both ends 29 of the delivery duct 28 being open.

What is claimed is:

1. A tank comprising:
   a wall;
   a variable volume chamber containing a liquid and partially defined by the wall;
   a shaft within the variable volume chamber;
   a piston supported by the shaft for movement therealong within said tank along the wall under thrust from powder gas at a temperature much higher than that of said liquid in order to increase or decrease the volume of said chamber, the powder gas provided from a gas generator located at one end of the tank; and
   a deformable elastomer membrane that is attached to and movable with said piston and that comprises:
      a single membrane including an annular inner opening and an annular outer edge, the annular inner opening attached to and sealed to the piston at a position proximate to the shaft, the annular outer edge attached to and sealed to the wall of the tank at the one end of the tank proximate the gas generator,
      a first portion of the single membrane that is continuously pressed against an entire face of said piston outside said chamber, and
      a second portion of the single membrane extending from said first portion in a foldable form to the outer annular edge;
   said membrane, as attached, disposed to thermally protect said wall outside of said chamber between the one end of the tank and said piston, and to provide sealing between said piston and said wall.

2. The tank according to claim 1, wherein said shaft forms a duct for delivering said liquid, said duct including an opening formed close to a distal end of the duct situated at a first end of said chamber, and at least one end that is open for delivering said liquid.

3. The tank according to claim 1, including an opening in its end wall enabling the liquid to be ejected in a travel direction of said piston.

4. A tank comprising:
   a wall;
   a variable volume chamber containing a liquid and partially defined by the wall;
   a piston disposed for moving either forward or backward within said tank along the wall, said piston movable under thrust from powder gas at a temperature much higher than that of said liquid in order to increase or decrease the volume of said chamber, the powder gas provided from a gas generator located at one end of the tank;
   a hollow shaft, the piston supported by the shaft for movement therealong, the shaft having an opening within the chamber and a duct that is structured and arranged to deliver said liquid through the opening and through the duct in a direction opposite to a travel direction of the piston to decrease the volume of said chamber; and
   a deformable elastomer membrane that is attached to and movable with said piston and that comprises
      a single membrane including an annular inner opening and an annular outer edge, the annular inner opening attached to and sealed to the piston at a position proximate to the shaft, the annular outer edge attached to and sealed to the wall of the tank at the one end of the tank proximate the gas generator,
      a first portion of the single membrane that is continuously pressed against an entire face of said piston outside said chamber and
      a second, connected portion of the single membrane extending from said first portion in a foldable form to the outer annular edge, said membrane, as attached, disposed to thermally protect said wall between the one end of the tank and said piston, and to provide sealing between said piston and said wall outside of said chamber.

5. The tank according to claim 4, wherein said piston moves along the shaft and the duct has an opening at or substantially at a distal end of the shaft and that is situated at a distal end of said chamber and at least one end of the shaft that is open for delivering said liquid.

6. The tank according to claim 4, including an opening in its end wall further enabling the liquid to be ejected in the travel direction of said piston.

7. The tank according to claim 1, wherein the shaft is hollow and includes an opening therein, and the hollow shaft forms a duct that is structured and arranged to deliver said liquid through the opening and through the duct in a direction opposite the travel direction.

8. The tank according to claim 1 further comprising an annular fastening means for attaching the deformable elastomer membrane to the piston.

9. The tank according to claim 4 further comprising an annular fastening means for attaching the deformable elastomer membrane to the piston.

10. The tank according to claim 1, wherein the foldable form of the second portion of the membrane includes a fold within said chamber, and the second portion is unfoldable to extend along the wall of said tank outside of the chamber as said piston moves under thrust to thermally protect said wall outside of said chamber.

11. The tank according to claim 1, wherein the inner opening of the first portion of the membrane is affixed to a central hub of said piston.

12. The tank according to claim 1, wherein the second portion of the membrane extends from the first portion to the outer edge attached to the one end of the wall of the tank outside of the chamber.

* * * * *